United States Patent
Yang

(10) Patent No.: US 9,846,444 B1
(45) Date of Patent: Dec. 19, 2017

(54) METHOD FOR CONTROLLING AND ADJUSTING FANS OF ELECTRONIC APPARATUS

(71) Applicant: AIC INC., Taoyuan (TW)

(72) Inventor: Yi-Rong Yang, Taoyuan (TW)

(73) Assignee: AIC INC., Taoyuan (TW)

( * ) Notice: Subject to any disclaimer, the term of this patent is extended or adjusted under 35 U.S.C. 154(b) by 0 days.

(21) Appl. No.: 15/616,222

(22) Filed: Jun. 7, 2017

(51) Int. Cl.
- G05D 23/275 (2006.01)
- H02P 6/16 (2016.01)
- G05D 23/19 (2006.01)
- G06F 1/20 (2006.01)
- H05K 7/20 (2006.01)

(52) U.S. Cl.
CPC ......... G05D 23/1951 (2013.01); G06F 1/206 (2013.01); H05K 7/206 (2013.01); H05K 7/207 (2013.01)

(58) Field of Classification Search
CPC .... G06F 1/206; G06F 11/3051; G06F 1/3203; Y02B 60/1275; G01K 1/026; G01K 7/42; G01K 13/02; G05B 13/024; G05B 11/16; G05B 13/027; G05D 23/1919; H02P 29/60; H02P 21/14; H02P 2207/01; H02P 6/34
USPC ............................ 318/268, 400.04, 610, 634
See application file for complete search history.

(56) References Cited

U.S. PATENT DOCUMENTS

| | | | | |
|---|---|---|---|---|
| 7,098,617 | B1* | 8/2006 | Oljaca | G06F 1/206 318/268 |
| 7,138,781 | B2* | 11/2006 | Murray | G05B 13/024 318/400.04 |
| 9,645,622 | B2* | 5/2017 | Ogawa | H05K 7/207 |
| 2006/0108962 | A1* | 5/2006 | Murray | G05B 13/024 318/610 |
| 2006/0181232 | A1* | 8/2006 | Oljaca | G06F 1/206 318/268 |
| 2006/0222045 | A1* | 10/2006 | Byquist | G01K 1/026 374/109 |
| 2009/0228148 | A1* | 9/2009 | Byquist | G01K 1/026 700/275 |
| 2012/0078420 | A1* | 3/2012 | Jensen | G05B 11/16 700/275 |
| 2012/0217316 | A1* | 8/2012 | Byquist | G01K 1/026 236/1 C |

(Continued)

*Primary Examiner* — Paul Ip
(74) *Attorney, Agent, or Firm* — Chun-Ming Shih; HDLS IPR Services

(57) ABSTRACT

A method for controlling and adjusting fans of the electronic apparatus is disclosed and comprises following steps: controlling a fan to operate according to a default value after an electronic apparatus is booted; obtaining operating watt value of a CPU after detecting that the temperature of the CPU reaches a set-point; inquiring one of a learning table and a pre-established neural-network data array for obtaining a PWM value and P,I,D parameters corresponding to the operating watt value; performing an error adjustment process to the obtained PWM value through a PID controller; controlling the operation of the fan according to the adjusted PWM value; storing the adjusted PWM value to the learning table if the temperature of the CPU equals the set-point; and, continuing to obtain, adjust and store the PWM value to continuously control the operation of the fan before the electronic apparatus is powered off.

10 Claims, 4 Drawing Sheets

(56) References Cited

U.S. PATENT DOCUMENTS

2015/0156917 A1* 6/2015 Ogawa .................. H05K 7/207
  361/695
2016/0301334 A1* 10/2016 Fu ........................ G05B 13/027

* cited by examiner

METHOD FOR CONTROLLING AND ADJUSTING FANS OF ELECTRONIC APPARATUS

BACKGROUND OF THE INVENTION

Field of the Invention

The present invention relates to a method for controlling fans, and especially to a method for controlling and adjusting fans of an electronic apparatus.

Description of Prior Art

An electronic apparatus having heavy load of calculation (such as supercomputer or server system) needs effective cooling of system to avoid interior elements from damage by overheat.

For example of server system, the existing server system mainly controls a cooling system in the server system through a proportional-integral-differential controller (PID controller). Specifically, the PID controller generates relative values for controlling and adjusting operation of fans in the cooling system. Generally, the values are pulse width modulation (PWM) signal.

However, if the server systems are to be arranged at different positions (for example, different locations or different countries), surrounding environments are different (with different temperatures and weather conditions). A user has to adjust P, I and D parameters used by a PID controller manually to control the cooling system, and to avoid inaccuracy of the PID controller resulting from different environments.

Besides, some electronic apparatuses apply a Neural network algorithm to dynamically calculate to generate the aforementioned PID parameters, for calculation of the PID controller. However, experiment has proved that the aforementioned issue resulting from different environment cannot be solved by calculating the above PID parameters through Neutral network algorithm.

Moreover, a general Neutral network algorithm continuously detects temperature of entire electronic apparatus or temperature of CPU, and dynamically performs calculation according to temperature to generate the above PID parameters. Thus, if the electronic apparatus causes the temperature to increase greatly and instantly for special condition, the existing cooling system spends much time to decrease the temperature of the electronic apparatus to be lower than a set-point. In this way, high temperature for a long time may damage interior elements of the electronic apparatus.

SUMMARY OF THE INVENTION

The present invention mainly provides a method for controlling and adjusting fans of the electronic apparatus to make fans of the electronic apparatus operate more effectively, and therefore obtain faster cooling.

Accordingly, the method for controlling and adjusting fans of the present invention mainly includes the following steps: controlling an operation of the fan according to a default rotating speed, after the electronic apparatus being booted; obtaining an operating watt value of the CPU while detecting the temperature of the CPU reaches the set-point; inquiring one of a learning table and a pre-established neural-network data array for obtaining a PWM value and PID parameters corresponding to the operating watt value according to the operating watt value.

Next, it goes to the following steps: performing an error adjustment process to the PWM value through the PID controller; controlling the operation of the fan according to the adjusted PWM value; storing the adjusted PWM value to the learning table if the temperature of the CPU equals the set-point (the adjusted PWM value has to be a time integral value of I parameter, that is, the PWM value currently adopted by the fan of the electronic apparatus); and continuing to obtain, adjust and store the PWM value to continuously control the operation of the fan before the electronic apparatus is powered off. In this way, the present invention makes the electronic apparatus able to be adopted to various environments, and to update by self-learning.

The present invention obtains predicted PWM value from a pre-established neural-network data array or a gradually established learning table, and uses the PID controller to perform error adjustment process to the predicted PWM value. Therefore, the present invention differs from relative art as for calculating the PWM value directly through the PID controller, or for dynamically calculating control of the PWM value by Neutral network algorithm according to temperature variation. Thus, the present invention can avoid searching an optimized solution of the PID parameters, and save develop time of factory. The present invention can make the electronic apparatus capable of self-adaptation, learning and developing to make fans operate more effectively, and thus obtain faster cooling of the electronic apparatus.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

The present invention discloses a method of controlling and adjusting fans of the electronic apparatus (hereafter referred to as the "method"), and the method is mainly applied to the electronic apparatus with heavy load of calculation and requiring effective cooling, such as a supercomputer, a server system, etc.

Specifically, the aforementioned electronic apparatus mainly has a central processing unit (CPU), a fan, and multiple electronic elements (such as memory, hard drive, network module, power supply module, output/input module, etc.). In the present invention, the method is mainly used for controlling operation of the fan to adjust rotating speed of the fan, and cooling the CPU. In this way, overheat resulting in decreased performance, malfunction, or damage of the CPU, and even crash or burnout of the electronic apparatus can be avoided. In other embodiments, the method may also be used, but not limited, for cooling other electronic elements besides the CPU in the electronic apparatus.

In related arts, the electronic apparatus mainly continuously monitors temperature of the CPU after being booted. If temperature of the CPU exceeds a threshold value, the electronic apparatus dynamically calculates (according to temperature of the CPU) to generate a rotating speed of the fan by a Neutral network algorithm, in order to control operation of the fan to cool the CPU. That is, the temperature of the CPU indicates the rotating speed of the fan, and cooling of the fan is slower.

Figure 1:
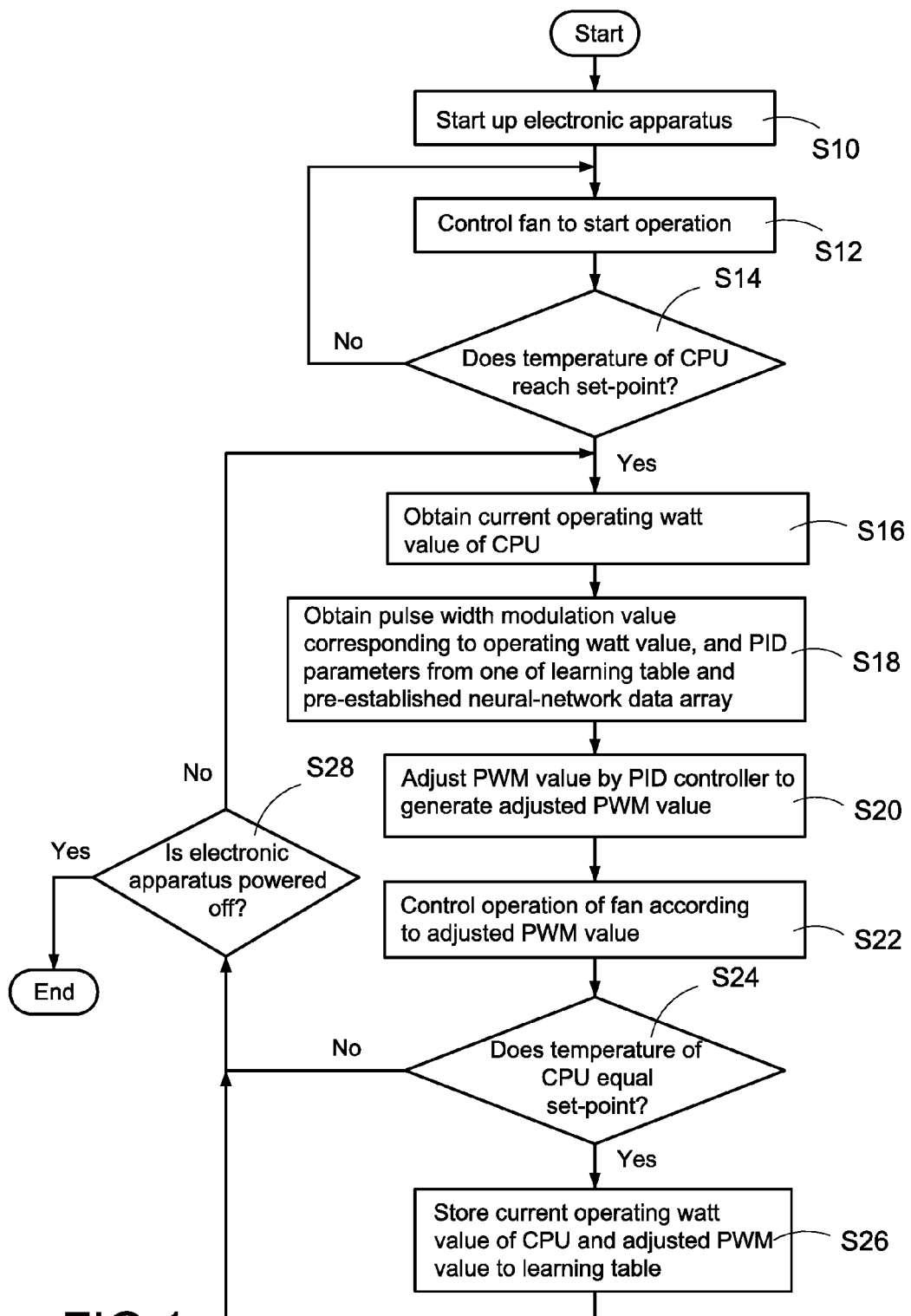
FIG. 1 shows a flowchart of controlling according to a first embodiment of the present invention.

Please refer to FIG. 1, which shows a flowchart of controlling according to a first embodiment of the present invention. In the present invention, a user, management staff, or controller starts up the electronic apparatus (step S10). After the electronic apparatus is started, the electronic apparatus controls the fan therein to start operation (step S12). Specifically, temperature of the electronic apparatus is low when being initially started so that the electronic apparatus may control the fan rotating in a default rotating speed.

In an embodiment, the electronic apparatus quickly reaches high temperature thermal balance (that is, temperature of the electronic apparatus increases with a maximum speed and stays at a set-point, resulting in less power consumed), because in aforementioned step S12, the electronic apparatus may control the fan, but not limited, for operating with a lowest rotating speed. The set-point is mainly lower than a maximum withstanding temperature (such as 70° C., 90° C. etc., depending on a serial number of the CPU) of the CPU of the electronic apparatus.

In an embodiment, the electronic apparatus further includes a temperature sensing unit, and the temperature sensing unit is close to or directly connected to the CPU, for sensing temperature of the CPU. In an embodiment, temperature of the CPU may be equal to temperature of the CPU surface. After step S12, the electronic apparatus continuously senses temperature of the CPU through the temperature sensing unit, and determines whether the temperature of the CPU reaches the set-point (step S14).

If the temperature of the CPU does not reach the set-point, it means that the electronic apparatus does not reach the aforementioned high temperature thermal balance. Therefore, step S12 is executed again to keep the fan rotating in the default rotating speed, and continuously increasing the temperature of the electronic apparatus.

Figure 4:
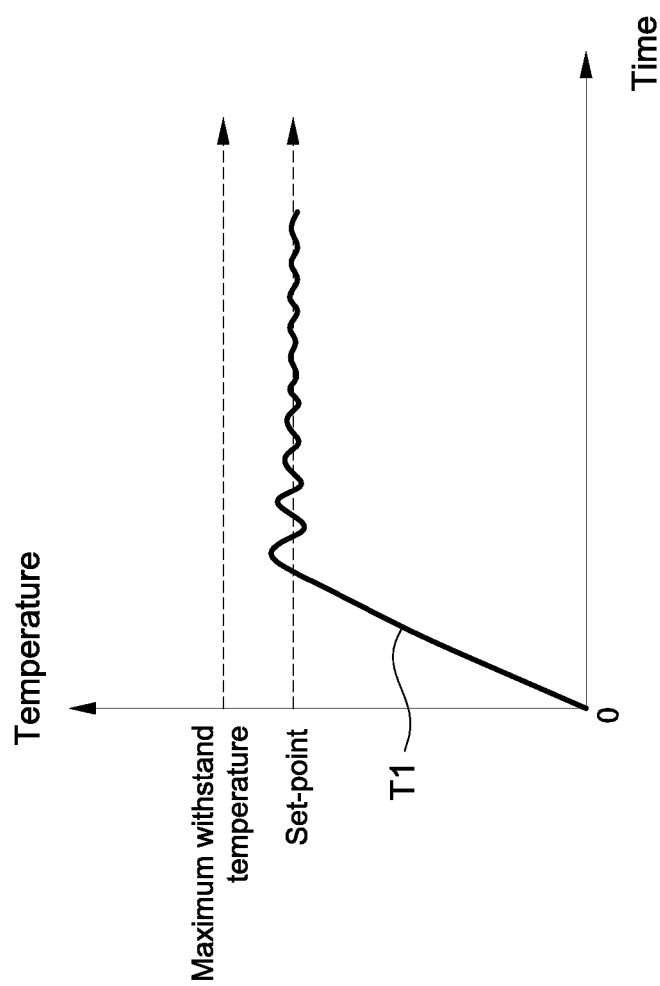
FIG. 4 shows a diagram of trend of temperature variation according to the first embodiment of the present invention.

Please refer to FIG. 4, which shows a diagram of trend of temperature variation according to the first embodiment of the present invention. As shown in FIG. 4, the set-point is lower than the maximum withstanding temperature of the CPU. In an embodiment, the set-point may be lower than the maximum withstand temperature by 1-3 degrees (for example, when the maximum withstand temperature is 70 degrees, the set-point may be 67 degrees). In another embodiment, the set-point may be lower than the maximum withstanding temperature by 1-10 degrees. Specifically, the set-point relates to cooling capacity of the electronic apparatus. Since the cooling speed is higher with the better cooling capacity of the electronic apparatus, the set-point can be set closer to the maximum withstand temperature.

It needs to be noted that, different CPUs have different maximum withstand temperatures, and each maximum withstand temperature is a temperature that has been tested and confirmed before each of the CPUs is out of the factory. In an embodiment, the electronic apparatus obtains serial number of the CPU after being booted and then confirms the maximum withstand temperature of the CPU through online or offline inquiry according to the serial number of the CPU. The electronic apparatus then automatically sets the set-point according to the inquired maximum withstand temperature. In another embodiment, the management staff may set the set-point manually according to experiment values when the electronic apparatus is produced, but not limited.

If the temperature of the CPU reaches the set-point, the electronic apparatus may further obtain a current operating watt value of the CPU (step S16). Specifically, the electronic apparatus may further include a watt value measuring unit, and the watt value measuring unit is electrically connected to the CPU for measuring the operating watt value (Watt) of the operating CPU.

In another embodiment, the electronic apparatus may continue to sense the temperature of the CPU through the temperature sensing unit after being booted, and measure the operating watt value of the CPU through the watt value measuring unit. If the operating watt value measured has large variation before the temperature of the CPU reaches the set-point, the electronic apparatus executes the following step S18, instead of waiting the temperature of the CPU to reach the set-point.

After step S16, a pulse width modulation (PWM) value corresponding to the operating watt value, and a proportional parameter (that is, P parameter), an integral parameter (that is, I parameter) and a differential parameter (that is, D parameter) needed by a proportional-integral-differential controller (that is, PID controller) for calculation are obtained from one of a learning table and a pre-established neural-network data array in the electronic apparatus (step S18). The PID controller is a prior art in the technical field, and thus description is not repeated here for brevity.

The aforementioned PID parameters are obtained according to the operating watt value in the method of the present invention. Because variation of the temperature is slower than that of the watt value, the load condition of the electronic apparatus can be known earlier through variation of the watt value, and the rotating speed of the fans is increased in advance for cooling.

It is known that, the aforementioned parameters optimized have no perfect formula solutions, and it has to take much time to search a set of optimized solution. If a set of optimized solution of the PID parameters is searched during the operation of the system, the system is highly possible to crash by overheat. The present invention is characterized in that the user may apply the predicted PID parameters estimated in advanced to implement a universal cooling control adopted to all environment and scenarios.

As mentioned above, by the method of the present invention, the factory of the electronic apparatus can calculate a set of PID parameters that is usable based on hardware specifications of the electronic apparatus such that the aforementioned universal cooling control can be achieved. Specifically, if the temperature of the electronic apparatus does not vary largely and even if the aforementioned P parameter, I parameter and D parameter estimated are not optimized, the PID controller still has enough time to accumulate a value of the I parameter to control the rotating speed of the fan for cooling.

As mentioned above, once the temperature of the electronic apparatus varies largely and instantly, the value of the I parameter will not be accumulated to the corresponding rotating speed of the fan so that the system is likely to be overheated. Accordingly, the method of the present invention measures variation level of the operating watt value to solve the aforementioned issue, that is, it is to predict that temperature will be vary largely according to the variation level of the operating watt value. Moreover, when large variation of the temperature is detected, a proper integral value of the I parameter can be added instantly (described later) to avoid overheat of the electronic apparatus.

After step S18, the electronic apparatus further adjusts the obtained PWM value by the PID controller to generate an adjusted PWM value (step S20). Afterward, the operation of the fan is controlled according to the adjusted PWM value (step S22). In other words, before the temperature of the CPU reaches the set-point and the operating watt value varies largely, the electronic apparatus controls the fan to operate with a default rotating speed. After the temperature of the CPU reaches the set-point for the first time or the operating watt value of the CPU largely varies, the electronic apparatus continues to generate the adjusted PWM value to control the fan to operate with the adjusted PWM value.

It needs to be noted that, the neural-network data array is a data matrix established by the management staff for training the electronic apparatus in advance, and a correspondence of the multiple PWM values, the proportional parameters, the integral parameters and the differential parameters, and the multiple operating watt values of the CPU is stored in the neural-network data array. In other words, values stored in the neural-network data array are the predicted values mentioned above. Specifically, the neural-network data array can be shown in the following table:

| operating watt value | PWM value | proportional parameters | integral parameters | differential parameters |
| --- | --- | --- | --- | --- |
| 90 W | PWM1 | P1 | I1 | D1 |
| 100 W | PWM2 | P2 | I2 | D2 |
| ... | ... | ... | ... | ... |
| 150 W | PWMn | Pn | In | Dn |

Through the neural-network data array, the electronic apparatus may directly obtain the PWM value (for controlling the rotating speed of the fan) by conducting inquiry based on the current operating watt value of the CPU, and adjust the PWM value to obtain the proportional parameter, the integral parameter and the differential parameter.

Specifically, the environment surrounding the management staff training the neural-network data array for the electronic apparatus may be different from that surrounding the electronic apparatus being booted (that is, different temperatures and weather conditions). Although the corresponding PWM value can be directly obtained by inquiring the neural-network data array, the PWM value still needs to be adjusted by an error adjustment process so as to make the operation of the fan meet requirement of the environment surrounding the electronic apparatus. In an embodiment, the aforementioned error adjustment process is implemented in the proportional parameter, the integral parameter and the differential parameter by the PID controller.

On the other side, the learning table is established gradually after the electronic apparatus is booted, and correspondence of the multiple operating watt values and the multiple PWM values of the CPU is stored in the learning table. In other words, the values stored in the learning table are confirmed values corresponding to environment. Thus, the PWM values stored in the learning table, compared with the PWM values stored in the neural-network data array, are more suitable for the requirement of environment surrounding the electronic apparatus.

In an embodiment, the electronic apparatus inquires the learning table in priority in aforementioned step S18, and inquires the neural-network data array when the PWM values corresponding to the current operating watt value of the CPU are not stored in the learning table.

Specifically, when the electronic apparatus is just booted, the content of the learning table is null, and thus the electronic apparatus would inquire the neural-network data array according to the operating watt value of the CPU to obtain the proportional parameters, the integral parameters and the differential parameters, and the PWM value corresponding to the operating watt value. The proportional parameters, the integral parameters and the differential parameters are values estimated by the factory as mentioned above, not optimized ones.

As mentioned above, in the present invention, the electronic apparatus directly obtains a set of predicted values after being booted (that is, obtaining the proportional parameters, the integral parameters and the differential parameters, and the PWM value stored and trained in advance after inquiring the neural-network data array). Though the set of predicted values are not absolutely accurate (that is, including error resulting from environment), the error is not too large. Thus, the cooling of the fan of the electronic apparatus in the present invention is more effective than that of relative art obviously.

After step S22, the electronic apparatus controls operation of the fan according to the adjusted PWM value to lower the temperature of the CPU by the fan so that the temperature of the CPU is lower than the maximum withstand temperature and varied within a particular range of the set-point (that is, as shown in FIG. 4, the CPU temperature T1 is kept within plus or minus 1 degree Celsius of the set-point).

It needs to be noted that, the electronic apparatus may include multiple temperature sensing units to respectively sense temperatures of different electronic elements, such as CPU, hard drive, memory, etc. Different electronic elements have different set points. In an embodiment, the PID controller adjusts an electronic element having the smallest error to generate the PWM value for controlling the fan.

For example, a set point of a CPU is 75 degrees, and the current temperature of the CPU is 77 degrees (that is, the error value is −2). On the other side, a set point of a hard drive is 65 degrees, and the current temperature of the hard drive is 70 degrees (that is, the error value is −5). In this moment, the error value of −5 is smaller than that of −2, and the PID controller would lower the temperature of the hard drive in priority to control the fan. However, the electronic elements in the electronic apparatus share the same fan, and while temperature of the hard drive is lowered, temperature of the CPU will be lower. As the error value of the CPU is smaller than that of the hard drive, the PID controller lowers temperature of the CPU to control the fan.

In the embodiment, after the temperature of the CPU reaches the set-point for the first time, the temperature sensing unit continues to monitor temperature of the CPU and keeps determining if the temperature of the CPU equals the set-point (step S24). If temperature of the CPU (that is, CPU temperature T1 shown in FIG. 4) equals the set-point, the electronic apparatus stores the current operating watt value of the CPU and the adjusted PWM value to the learning table, makes the adjusted PWM value relate to the operating watt value, and uses the adjusted PWM value to be a confirmed PWM value corresponding to the operating watt value (step S26).

As mentioned above, if the temperature of the CPU does not equal the set-point, the electronic apparatus only controls the fan according to the adjusted PWM value, but does not store the adjusted PWM value used to the learning table. In an embodiment, the electronic apparatus determines that temperature of the CPU equals the set-point when temperature of the CPU is identical to the set-point or difference between temperature of the CPU and the set-point is smaller than a threshold value (for example, 0.1-0.5° C.), but not limited.

In an embodiment, the electronic apparatus may temporarily store the adjusted PWM value and the operating watt value to a register or a volatile memory (not shown) of the electronic apparatus to make the electronic apparatus re-learn and re-establish the learning table after being rebooted, and increase flexibility of the method. In another embodiment, the electronic apparatus also may store the adjusted PWM value and the operating watt value to a non-volatile memory of the electronic apparatus permanently (not shown) to store the learning table permanently without being influenced by the electronic apparatus being powered on/off, but not limited.

After step S24 and step S26, the method further determines whether the electronic apparatus is powered off (step S28), and repeats to execute step S16 to step S26 before the electronic apparatus is powered off. Accordingly, the electronic apparatus continually obtains the PWM value corresponding to the operating watt value, adjusts the PWM value according to the operating watt value of the CPU, controls operation of the fan according to the adjusted PWM value, and stores the confirmed PWM value to the learning table.

As shown in FIG. 4, after the electronic apparatus is booted for a period of time, the CPU temperature T1 oscillates around the set-point up and down repeatedly, and there are many the operating watt values and the confirmed PWM values corresponding to the operating watt values stored to the learning table. The learning table may be the table as follows:

| operating watt value | confirmed PWM value |
|---|---|
| 90 W | PWM1 |
| 100 W | PWM2 |
| ... | ... |
| 150 W | PWMn |

In aforementioned step S18, the electronic apparatus mainly compares the current operating watt value of the CPU with the plurality of operating watt values stored in the learning table through machine learning algorithm to determine if the current operating watt value of the CPU is approximate to any one of the plurality of operating watt values stored in the learning table. If a difference between the current operating watt value of the CPU and one of the plurality of operating watt values stored in the learning table is within an error range, the electronic apparatus determines that the two operating watt values are similar, and thus directly uses the confirmed PWM value corresponding to the similar operating watt value in the learning table.

Otherwise, if it is determined that the current operating watt value of the CPU is not similar to any one of the operating watt values stored in the learning table, then the electronic apparatus inquires the neural-network data array. Accordingly, if operation of the electronic apparatus is longer, and amount of data stored in the learning table is larger, and the electronic apparatus has more opportunity to obtain the confirmed PWM value by inquiring the learning table. If the operation of the electronic apparatus is longer than a particular time, the pre-established neural-network data array may be disregarded by the electronic apparatus and not referred.

Figure 2:
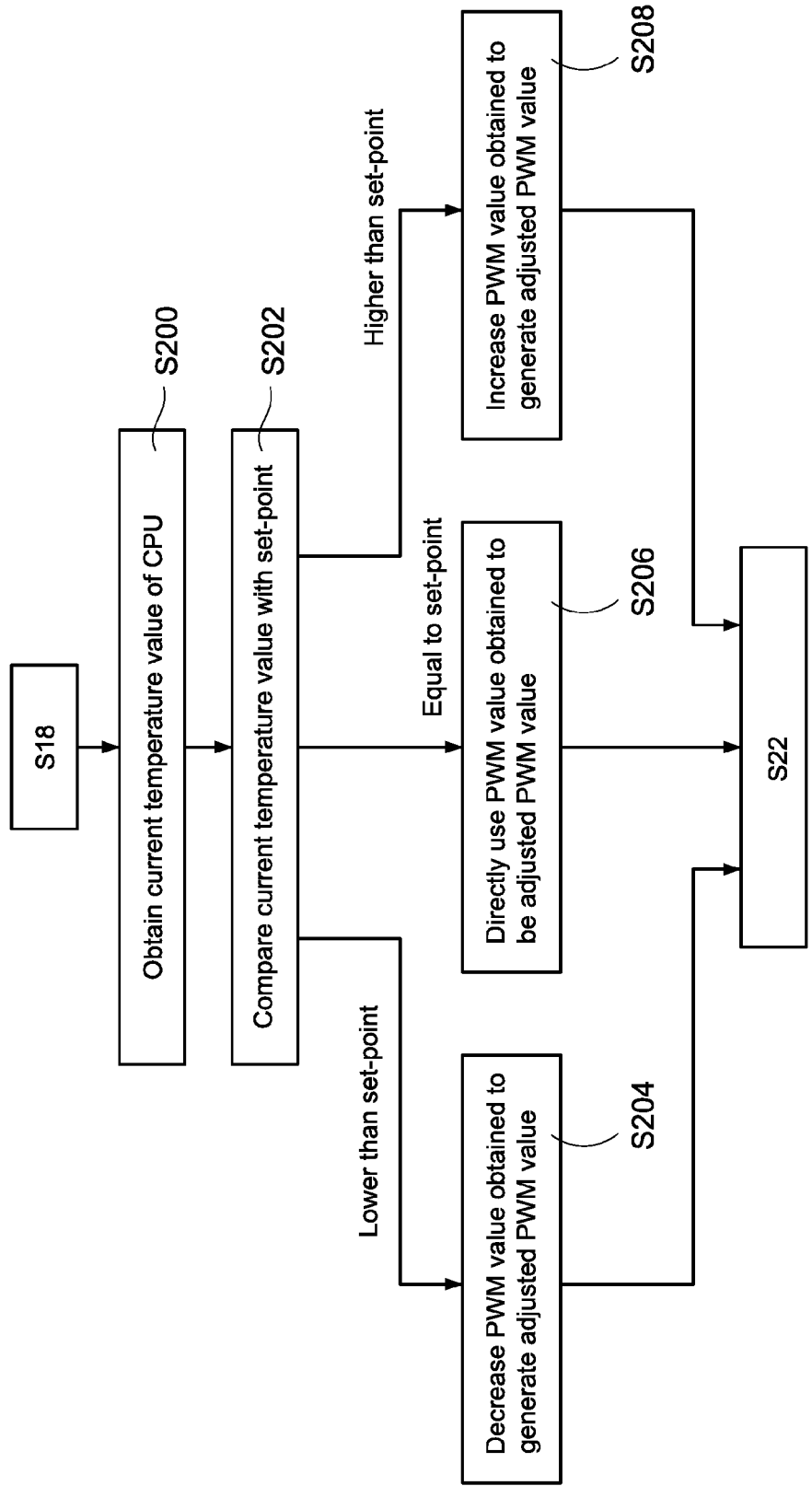
FIG. 2 shows a flowchart of error adjustment according to the first embodiment of the present invention.

Please refer to FIG. 2, which shows a flowchart of error adjustment according to the first embodiment of the present invention. FIG. 2 further illustrates error adjustment of step S20 shown in FIG. 1.

As shown in FIG. 2, after step S18 in FIG. 1, the electronic apparatus obtains a current temperature value of the CPU by the temperature sensing unit (step S200). Next, the current temperature value (that is, same as the CPU temperature T1 in FIG. 4) is compared with the set-point (step S202). After comparison, the electronic apparatus may obtain at least the following three results.

After comparison, if it is determined that the current temperature value is lower than the set-point, then the electronic apparatus decreases the PWM value obtained in step S18 to generate the adjusted PWM value (step S204).

After comparison, if it is determined that the current temperature value equals the set-point, then the electronic apparatus does not adjust the PWM value obtained in step S18, but directly uses the PWM value to be the adjusted PWM value (step S206).

After comparison, if it is determined that the current temperature value is higher than the set-point, then the electronic apparatus increases the PWM value obtained in step S18 to generate the adjusted PWM value (step S208).

Finally, the electronic apparatus executes step S22 according to the adjusted PWM value generated in step S204, S206 or S208 to control the operation of the fan.

In an embodiment, the electronic apparatus mainly executes aforementioned step S204, S206 and S208 by the PID controller to execute the error adjustment to generate the adjusted PWM value. Specifically, the PID controller calculates to generate the adjusted PWM value according to a first formula, wherein the first formula is the following:

$$P \times e + \int I \times e \, dt + D \times de/dt \qquad \text{first formula.}$$

As the first formula mentioned above, wherein P is the proportional parameter, I is the integral parameter, D is the differential parameter, e is a difference between the current temperature value and the set-point.

Specifically, if the current temperature value equals the set-point, the difference e equals 0, and $P \times e$ and $D \times de/dt$ is 0. That is, the first formula outputs a value of $\int I \times e \, dt$.

As mentioned above, $\int I \times e \, dt$ is an integral value, If the value $A_{t1}$ at the first second T1 is $I \times e_{t1}$, and the value $A_{t2}$ at the second T2 is $A_{t1} + I \times e_{t1}$. In the embodiment, if the current temperature value of the CPU equals the set-point, the difference e is 0, and $P \times e = 0$, $D \times de/dt = 0$, while value of $\int I \times e \, dt$ is accumulated from former values. As mentioned above, the electronic apparatus stores the PWM value only if the current temperature value equals the set-point (that is, e=0), no matter during the training in advance or the operation, and, the PWM value is stored in the neural-network data array, and the confirmed PWM value is stored in the learning table, i.e. value of $\int I \times e \, dt$.

It needs to be noted that, if the electronic apparatus suddenly performs large amount of calculation and makes the watt value/temperature of the CPU rise suddenly, cooling of the fan may be slower than rising of temperature, and this may make the fan operate normally but the temperature still not descends or even keeps rising. In view of this, in another embodiment, the PID controller may be an index type PID controller (exponential PID controller), and the index type PID controller calculates to generate the adjusted PWM value according to a second formula, wherein the second formula is as the following:

$$P \times e + \int I \times edt + D \times \frac{de}{dt} \times e^2. \qquad \text{second formula}$$

As mentioned above, when the electronic apparatus operates steadily, the difference e between temperature of the CPU and the set-point will be within positive/negative 1° C. If temperature of the CPU largely rises instantly, the difference e rushes instantly, and the adjusted PWM value immediately indicates the temperature rush by e^2 in the second formula. In this way, the rotating speed of the fan can rise instantly, and the temperature of the CPU is reduced and kept steady as soon as possible to be maintained at the set-point.

Figure 3:
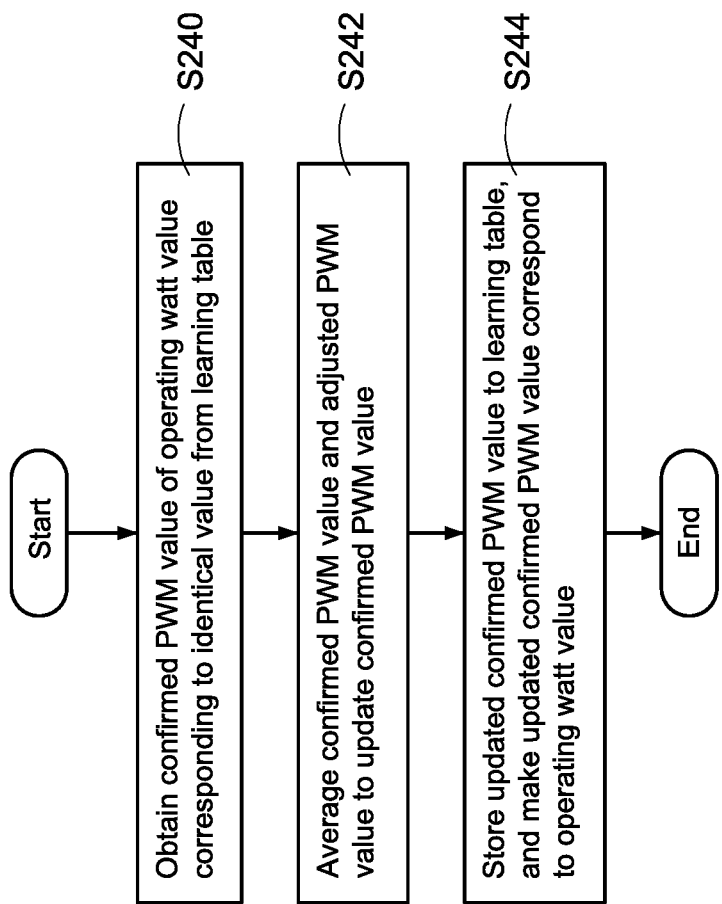
FIG. 3 shows a flowchart of rotating speed learning according to the first embodiment of the present invention.

Refer to FIG. 3, FIG. 3 shows a flowchart of rotating speed learning according to the first embodiment of the present invention. FIG. 3 further illustrates storing in step S24 in FIG. 1 in detail.

As mentioned above, the electronic apparatus stores the adjusted PWM value used to the learning table if temperature of the CPU equals the set-point. However, after the electronic apparatus operates for a longer time, data in the learning table will be excess, and thus storage of the electronic apparatus is wasted.

In the embodiment, the electronic apparatus mainly obtains the learning table and obtains the confirmed PWM value of the operating watt value corresponding to identical value from the learning table, for storing the operating watt value of the CPU and the adjusted PWM value corresponding to the operating watt value (step S240). Next, the electronic apparatus averages the confirmed PWM value and the adjusted PWM value to update the confirmed PWM value (step S242).

Finally, the electronic apparatus stores the updated confirmed PWM value to the learning table, and makes the updated confirmed PWM value correspond to the operating watt value (step S244).

In this way, if operation of the electronic apparatus is longer, data stored in the learning table is more accurate. Thus, when the operation of the electronic apparatus exceeds the aforementioned particular time, it is not necessary to refer to the neural-network data array finished and established by the training in advance.

Through the method of the present invention, the PWM value and PID parameters stored in the neural-network data array finished and established by the training in advance can be referred when the electronic apparatus is just booted, and the fan is controlled by predicted value for faster cooling. After the electronic apparatus is booted for a period of time, the PWM value stored in the learning table gradually established to control the fan by the confirmed value, for matching the requirement of the environment surrounding the electronic apparatus better.

Thus, particular embodiments have been described. Other embodiments are within the scope of the following claims. For example, the actions recited in the claims may be performed in a different order and still achieve desirable results.

What is claimed is:

1. A method for controlling and adjusting fans of an electronic apparatus, the electronic apparatus having a CPU and a fan, the method comprising steps of:
   (a) controlling an operation of the fan according to a default rotating speed after the electronic apparatus being booted;
   (b) detecting whether a temperature of the CPU reaches a set-point;
   (c) obtaining an operating watt value of the CPU currently after the temperature of the CPU reaches the set-point;
   (d) inquiring one of a learning table and a pre-established neural-network data array for obtaining a PWM value and PID parameters corresponding to the operating watt value, an integral parameter and a differential parameter, for calculation of a PID controller;
   (e) performing an error adjustment to the PWM value through the PID controller to generate an adjusted PWM value;
   (f) controlling the operation of the fan according to the adjusted PWM value;
   (g) sensing whether the temperature of the CPU equals the set-point; and
   (h) storing the adjusted PWM value and the operating watt value to the learning table correspondingly when the temperature of the CPU equals the set-point to use the adjusted PWM value to be a confirmed PWM value corresponding to the operating watt value.

2. The method for controlling and adjusting fans of the electronic apparatus of claim 1, further comprising following steps of:
   (i) determining whether the electronic apparatus is powered off after step (h); and
   (j) repeating to perform step (c) to step (h) before the electronic apparatus being powered off.

3. The method for controlling and adjusting fans of the electronic apparatus of claim 1, wherein the default rotating speed is a lowest rotating speed of the fan, the set-point is lower than a maximum withstand temperature of the CPU.

4. The method for controlling and adjusting fans of the electronic apparatus of claim 1, wherein the electronic apparatus has a temperature sensing unit and a watt value measuring unit, the temperature of the CPU is sensed by the temperature sensing unit in step (b) and step (g), the operating watt value of the CPU is measured by the watt value measuring unit in step (c).

5. The method for controlling and adjusting fans of the electronic apparatus of claim 1, wherein the learning table is inquired in priority in step (d), and the neural-network data array is inquired when the confirmed PWM value corresponding to the operating watt value is not present in the learning table, wherein a correspondence of the proportional parameters, the integral parameters and the differential parameters, the multiple PWM values and the multiple operating watt values of the CPU trained in advance is stored in the neural-network data array.

6. The method for controlling and adjusting fans of the electronic apparatus of claim 5, wherein step (e) comprises the following steps:
   (e1) obtaining a current temperature value of the CPU;
   (e2) comparing the current temperature value with the set-point;
   (e3) decreasing the PWM value to generate the adjusted PWM value when the current temperature value being lower than the set-point;
   (e4) using the PWM value to be the adjusted PWM value when the current temperature value equaling the set-point; and
   (e5) increasing the PWM value to generate the adjusted PWM value when the current temperature value being higher than the set-point.

7. The method for controlling and adjusting fans of the electronic apparatus of claim 5, wherein the PID controller generates the adjusted PWM value according to a first formula, the first formula is: P×e+∫I×e dt+D×de/dt, wherein P is the proportional parameter, I is the integral parameter, D is the differential parameter, e is a difference between the current temperature value and the set-point.

8. The method for controlling and adjusting fans of the electronic apparatus of claim 7, wherein the confirmed PWM value stored to the learning table in step (h) is a value of ∫I×e dt.

9. The method for controlling and adjusting fans of the electronic apparatus of claim 7, wherein the PID controller is an index type PID controller, and the index type PID controller generates the adjusted PWM value according to a second formula, the second formula is:

$$P \times e + \int I + edt + D \times \frac{de}{dt} \times e^2.$$

10. The method for controlling and adjusting fans of the electronic apparatus of claim 7, wherein step (h) comprises the following steps:
- (h1) obtaining the confirmed PWM value corresponding to the operating watt value of an identical value in the learning table;
- (h2) averaging the confirmed PWM value and the adjusted PWM value to update the confirmed PWM value; and
- (h3) storing the confirmed PWM value updated and corresponding to the operating watt value to the learning table.

* * * * *